(12) United States Patent
Walters et al.

(10) Patent No.: US 10,120,700 B1
(45) Date of Patent: Nov. 6, 2018

(54) USING A CONTROL VIRTUAL DISK FOR STORAGE MANAGEMENT

(71) Applicant: Tintri Inc., Mountain View, CA (US)

(72) Inventors: Rex R. Walters, Los Gatos, CA (US); Brandon W. Salmon, Menlo Park, CA (US)

(73) Assignee: Tintri Inc., Mountain View, CA (US)

( * ) Notice: Subject to any disclaimer, the term of this patent is extended or adjusted under 35 U.S.C. 154(b) by 355 days.

(21) Appl. No.: 14/043,485

(22) Filed: Oct. 1, 2013

Related U.S. Application Data

(60) Provisional application No. 61/709,062, filed on Oct. 2, 2012.

(51) Int. Cl.
*G06F 9/455* (2018.01)
*G06F 17/30* (2006.01)
*G06F 21/62* (2013.01)

(52) U.S. Cl.
CPC .......... *G06F 9/455* (2013.01); *G06F 9/45537* (2013.01); *G06F 9/45558* (2013.01); *G06F 17/30091* (2013.01); *G06F 21/62* (2013.01)

(58) Field of Classification Search
CPC ....... G06F 3/061; G06F 12/0866; G06F 21/62
See application file for complete search history.

(56) References Cited

U.S. PATENT DOCUMENTS

| | | | |
|---|---|---|---|
| 7,243,207 B1 * | 7/2007 | Prakash | G06F 17/30067 707/E17.01 |
| 7,865,663 B1 * | 1/2011 | Nelson et al. | 711/112 |
| 8,453,145 B1 * | 5/2013 | Naik | G06F 9/45558 718/1 |
| 8,601,473 B1 * | 12/2013 | Aron et al. | 718/1 |
| 8,683,111 B2 * | 3/2014 | Wade | G06F 9/45558 711/6 |
| 8,938,517 B2 * | 1/2015 | Fishgait et al. | 709/217 |
| 2009/0119538 A1 * | 5/2009 | Scales et al. | 714/6 |
| 2009/0241114 A1 * | 9/2009 | Kirihata | G06F 21/62 718/1 |
| 2009/0300023 A1 * | 12/2009 | Vaghani | G06F 3/0607 |
| 2010/0050170 A1 * | 2/2010 | Parikh | G06F 9/45537 718/1 |
| 2010/0186014 A1 * | 7/2010 | Vaghani | G06F 3/06 718/101 |
| 2010/0299667 A1 * | 11/2010 | Ahmad | G06F 12/1018 718/1 |
| 2011/0185292 A1 * | 7/2011 | Chawla | G06F 9/5077 715/760 |
| 2011/0265083 A1 * | 10/2011 | Davis | G06F 12/0866 718/1 |
| 2011/0271062 A1 * | 11/2011 | Chen | G06F 3/061 711/154 |
| 2012/0005668 A1 * | 1/2012 | Serizawa | G06F 12/0866 718/1 |
| 2012/0054746 A1 * | 3/2012 | Vaghani | G06F 9/5022 718/1 |

(Continued)

*Primary Examiner* — Lewis A Bullock, Jr.
*Assistant Examiner* — Gilles Kepnang
(74) *Attorney, Agent, or Firm* — Van Pelt, Yi & James LLP

(57) ABSTRACT

Storage management is disclosed, including: causing at least a control portion of a virtual disk to be created for a virtual machine; and using the at least control portion of the virtual disk as a communication channel between the virtual machine and a storage system.

28 Claims, 13 Drawing Sheets

(56) References Cited

U.S. PATENT DOCUMENTS

| | | | | |
|---|---|---|---|---|
| 2012/0137062 A1* | 5/2012 | Arges | G06F 9/45558 | |
| | | | 711/113 | |
| 2012/0233434 A1* | 9/2012 | Starks | G06F 3/0644 | |
| | | | 711/170 | |
| 2012/0304171 A1* | 11/2012 | Joshi | G06F 9/45558 | |
| | | | 718/1 | |
| 2013/0167155 A1* | 6/2013 | Davis | G06F 12/0866 | |
| | | | 719/312 | |
| 2013/0198738 A1* | 8/2013 | Reddin | G06F 9/45558 | |
| | | | 718/1 | |
| 2014/0040572 A1* | 2/2014 | Kotagiri et al. | 711/159 | |
| 2014/0075440 A1* | 3/2014 | Prahlad | G06F 17/30091 | |
| | | | 718/1 | |

* cited by examiner ized by the storage system as a conventional storage operation, such as a read or write operation. As used herein, a "user with the appropriate access privileges" refers to a user that meets a configured level of access privileges to the guest operating system (and therefore the virtual machine on which the guest operating system runs). For example, one example of a user with the appropriate access privileges is an administrator user. In various embodiments, a user that is not enabled with the configured level of access privileges to the guest operating system is not enabled to successfully request storage management operations to be performed by the storage system for the virtual machine, for security reasons.

USING A CONTROL VIRTUAL DISK FOR STORAGE MANAGEMENT

CROSS REFERENCE TO OTHER APPLICATIONS

This application claims priority to U.S. Provisional Patent Application No. 61/709,062 entitled USING A CONTROL VIRTUAL DISK FOR SELF-SERVICE STORAGE MANAGEMENT filed Oct. 2, 2012 which is incorporated herein by reference for all purposes.

BACKGROUND OF THE INVENTION

Conventionally, a guest operating system of a virtual machine is configured to go through a hypervisor to request an operation, such as a read or write, to be performed by a storage system. The storage system may be configured to store data associated with one or more virtual disks of the virtual machine. Without a laborious configuration, typically, a guest operating system of a virtual machine cannot directly request certain management operations, such as snapshotting, to be performed by the storage system because the guest operating system may not have the appropriate level of privilege to gain access to the storage system and/or does not know or have access to a communication channel to contact the storage system, which is commonly implemented on a device separate from the one on which the virtual machine is running.

BRIEF DESCRIPTION OF THE DRAWINGS

Various embodiments of the invention are disclosed in the following detailed description and the accompanying drawings.

DETAILED DESCRIPTION

Figure 1:
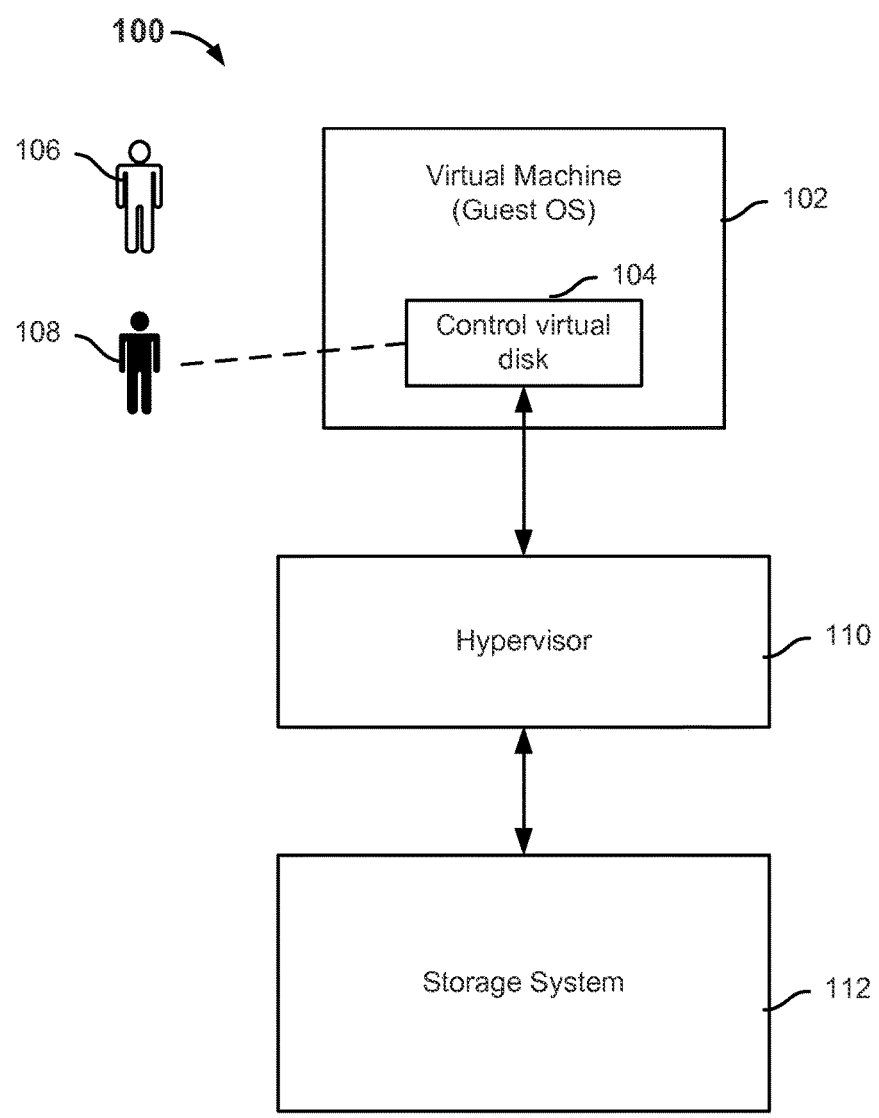
FIG. 1 is a diagram showing an embodiment of a system for storage management.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of storage management are described herein. To enable a user that meets a configured level of access privileges to a guest operating system running a virtual machine to perform management/control operations with respect to the storage as seen by the virtual machine, a virtual disk of the virtual machine is configured to become a communication channel between the guest operating system and the storage system. In various embodiments, either an entire virtual disk may be configured as a control virtual disk or a portion of a virtual disk is configured as a control portion. In various embodiments, a user with the appropriate level of access privileges to the guest operating system is enabled to request a storage management operation to be performed by the storage system by writing data (e.g., via a software application running on the virtual machine) associated with the requested management operation to (e.g., an appropriate location of) the control virtual disk or control portion of a virtual disk. The write to the control virtual disk is detected by the storage system, which will interpret the data written to the control virtual disk or control portion of a virtual disk as control disk traffic from the guest operating system. In some embodiments, after processing the control disk traffic (e.g., that includes a requested storage management operation), the storage system may transfer response data associated with the control disk traffic back to the guest operating system via the control disk or control portion of a virtual disk.

At least the control portion of a virtual disk described herein enables a user with the appropriate access privileges to the guest operating system to directly request storage management operations of the storage system, in a manner that does not require any additional communication channel than that normally used by the guest operating system running on a virtual machine to read and write to the storage system. Put another way, a user with the appropriate access privileges is enabled to self-service certain storage management operations via access to a control disk or control portion of a virtual disk. Furthermore, the use of control virtual disks or control portions of virtual disks enables users to perform such storage management for themselves without requiring help or direct coordination with the hypervisor administrator. Avoiding reliance on the hypervisor administrator for help may provide users with greater responsiveness, flexibility, and control. Also, the hypervisor administrator may be relieved from performing certain tasks.

Storage management as described herein is useful, for example, when a user with the appropriate level of access privilege desires to access older snapshot versions of virtual disks to possibly restore older versions of data, to revert the on-disk state of the virtual machine to a specific snapshot possibly to reproduce and debug problems, and to perform other management operations on the physical storage system that may require access or modification to the on-disk state.

FIG. 1 is a diagram showing an embodiment of a system for storage management. In the example, system 100 includes virtual machine 102, user 106, user 108, hypervisor 110, and storage system 112. In the example, a guest operating system (shown as "guest OS" in the diagram) is running on virtual machine 102 and virtual machine 102 is associated with control virtual disk 104. Any type of guest operating system may be running on virtual machine 102. Virtual machine 102 and hypervisor 110 may be running on the same device or different devices.

Hypervisor 110 comprises a virtual machine management infrastructure that creates the files that store the contents of virtual disks associated with virtual machine 102 and other data. In various embodiments, hypervisor 110 is configured to detect and inform (e.g., via a network protocol) storage system 112 when a disk operation (e.g., a read or write operation) has been performed at virtual machine 102. For example, hypervisor 110 may inform storage system 112 the offset, size, the type of the operation (e.g., read or write), and if applicable, the data to be written to the storage system associated with a disk operation that has been performed at virtual machine 102. In various embodiments, storage system 112 refers to one or more physical systems and/or associated hardware and/or software components configured to work together to store and manage stored data, such as files or other stored data objects. Storage system 112 is configured to store data and metadata associated with one or more virtual machines, including virtual machine 102.

Control virtual disk 104 is configured for virtual machine 102. While the communication channel between the guest operating system of virtual machine 102 and storage system 112 may be implemented as a whole virtual disk, such as control virtual disk 104, or only a portion of a virtual disk, such as a control portion of a virtual disk, for illustrative purposes, the whole virtual disk embodiment is described in the example of FIG. 1. In some embodiments, control virtual disk 104 is created from either a newly created virtual disk or from an existing virtual disk by a guest-side software (e.g., a script or binary). In some embodiments, the script or binary is also configured to ensure that control disk traffic (e.g., describing a storage management operation) from a user with the required level of access privileges to the guest operating system of virtual machine 102 is written in an appropriate manner to control virtual disk 104 such that the management operation can be detected as control disk traffic by storage system 112. In various embodiments, control disk traffic refers to data communicated between a virtual machine and a storage system over a control virtual disk (or control portion of a virtual disk). In various embodiments, control disk traffic refers to data associated with a storage management task (e.g., opening/closing a session, a storage management operation) or an ongoing stream of data (which may or may not contain explicit storage management tasks). To hypervisor 110, control virtual disk 104 appears as a normal, non-control virtual disk.

In response to the creation of control virtual disk 104 at virtual machine 102, storage system 112 is configured to store metadata that identifies that control virtual disk 104 (and/or the offsets of control virtual disk 104) associated with virtual machine 102 comprises a control virtual disk. In some embodiments, each control virtual disk or control portion of a virtual disk is associated with a single virtual machine. In some embodiments, storage system 112 is also configured to store policies, control restrictions (e.g., a required level of access privilege that is required to send control disk traffic via a control virtual disk), and/or other data related to control virtual disk 104. In some embodiments, storage system 112 is also configured to create a file or other type of data object at storage system 112 to track data that is written to control virtual disk 104 and/or a state that is associated with control virtual disk 104.

To initiate a management operation to be performed by storage system 112, data associated with the storage management operation is written, via a software application running on virtual machine 102, to control virtual disk 104 of virtual machine 102. In some embodiments, the data associated with the storage management operation is written as specially formatted control blocks. In some embodiments, the control blocks are required to be written to special offsets associated with control virtual disk 104. Hypervisor 110 is configured to detect and inform storage system 112 that a disk operation has occurred with respect to a virtual disk of virtual machine 102. In some embodiments, hypervisor 110 is not aware of the difference between control virtual disks and non-control virtual disks, hypervisor 110 treats a write operation to control virtual disk 104 the same as a write operation to a non-control virtual disk. Based on the information provided by hypervisor 110 regarding a write associated with virtual machine 102 and/or using stored metadata associated with virtual machine 102, storage system 112 is configured to determine that the write had been performed with respect to control virtual disk 104 and as a result, should be treated as a control disk traffic, unlike a normal write operation. Storage system 112 is configured to read the data associated with the control disk traffic written to control virtual disk 104 and process the control disk traffic. After the control disk traffic is processed (e.g., the storage management operation that is described by the control disk traffic is performed), storage system 112 is configured to write response data, such as, for example, a result associated with the performed storage management operation, to control virtual disk 104. The guest operating system running on virtual machine 102 is configured to read the response data written to control virtual disk 104, and thereby receive a response that is produced by storage system 112. Examples of storage management operations may include, but are not limited to, creating snapshots; attaching a new virtual disk to a virtual machine with older snapshot versions of data for data recovery purposes; reverting the state of a virtual disk to an earlier state; enabling/disabling certain storage management features related to quality-of-service/performance; accessing state, statistics or reporting information of a virtual machine or virtual disk; adding or removing virtual disks to the virtual machine; HTTP traffic; and even general purpose (not limited to storage) modification or monitoring of the virtual machine.

Without the implementation of storage management as described herein, some of the example storage management operations are not possible to be requested and/or performed on demand by a user of the appropriate level of access privileges. For example, typically, snapshots are configured to be taken periodically and a user may request to use a snapshot that has been taken at a preconfigured period, rather than have the option to request for a snapshot to be taken at a desired time, as is now possible with the storage management techniques described herein.

In some embodiments, prior to writing data associated with the storage management operation to control virtual disk 104, data associated with starting a new session is written to control virtual disk 104 via a software running on virtual machine 102. Storage system 112 is configured to create a new session based on the data written to control virtual disk 104 and in some embodiments, is configured to write information associated with a new session to control virtual disk 104. The session information written by storage system 112 to control virtual disk 104 is to be read and in some embodiments, processed by the guest operating system of virtual machine 102. Once the session has been established, a storage management operation may be requested by the guest operating system of virtual machine 102 of storage system 112 in the context of the established session.

In some embodiments, not all users of virtual machine 102 are permitted to use control virtual disk 104. As mentioned earlier, only a user of a certain level of access privileges to the guest operating system of virtual machine 102 may be permitted to access control virtual disk 104 to communicate control disk traffic to storage system 112. In some embodiments, the required level of access privileges needed to access control virtual disk 104 is included in policies and/or control restrictions associated with control virtual disk 104 and/or virtual machine 102 stored by storage system 112. Because, in some embodiments, a control virtual disk is associated with one virtual machine, policies and/or control restrictions associated with a control virtual disk also apply to that virtual machine. For example, the required level of access privileges is administrative privileges. Put another way, a user with administrative privileges to the guest operating system of virtual machine 102 is also permitted to access control virtual disk 104 (e.g., to request management operations at storage system 112), without an additional layer of authentication. Limiting access to a control virtual disk of a virtual machine to only certain users of that virtual machine is particularly useful in an environment with multiple virtual machines because it prevents a user of a first virtual machine (but not a second virtual machine) from performing management operations that could affect the second virtual machine. Therefore, the control virtual disks described herein can limit not only access to storage management operations related to a virtual machine to only some users of the virtual machine but also the effects of the storage management operations to that virtual machine. By utilizing virtual machine 102's native access control mechanisms, the administrator of virtual machine 102 can make access control decisions without requiring intervention from the administrator of hypervisor 110, by allowing or disallowing users access to control virtual disk 104. However, the hypervisor administrator is still able to limit the type of access allowed from any user of virtual machine 102, without requiring coordination with the virtual machine administrator.

For example, assume that user 106 has guest privileges to the guest operating system of virtual machine 102 and user 108 has administrative privileges to the guest operating system of virtual machine 102. Assume that in this example, administrative privileges are required to access control virtual disk 104. Therefore, while both user 106 and user 108 have access to perform some functions with respect to the guest operating system, user 106 does not have administrative privileges and is therefore not permitted to access control virtual disk 104 but user 108 does have administrative privileges and is therefore permitted to access control virtual disk 104.

A system of storage management as described herein provides several advantages. First, virtual machines can already access virtual disks and therefore may not require any additional configuration or modification to access the control virtual disks (or control portions of virtual disks). Second, any command blocks received via the control virtual disk are self-authenticated and authorized in the sense that whichever user submitted the command has the required level of access privileges to the guest operating system running in the virtual machine, and therefore may be assumed to have the authority to send control disk traffic. Third, hypervisor administrators can easily control which virtual machines are permitted access to the management operations via control virtual disks by provisioning or not provisioning a control virtual disk or by placing restriction on the use of the control virtual disk.

Figure 2:
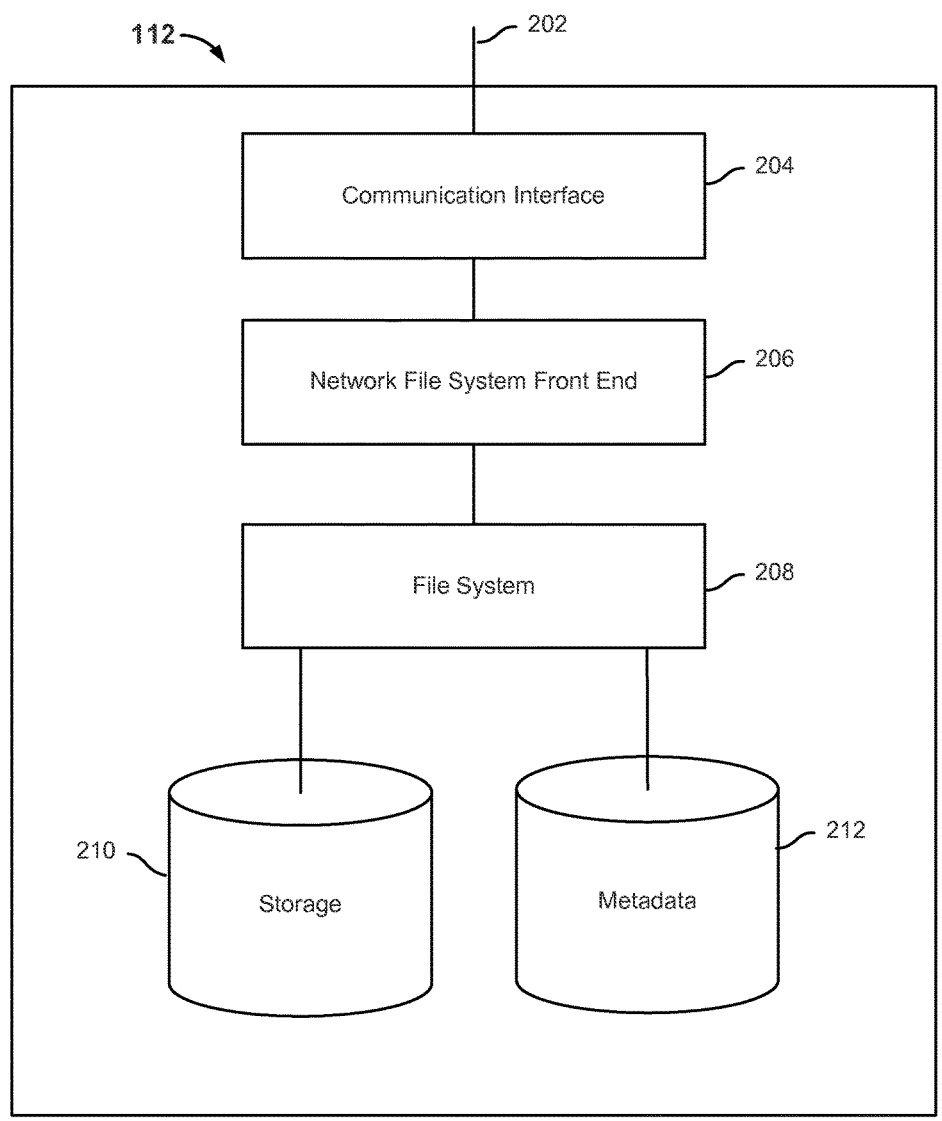
FIG. 2 is a diagram showing an embodiment of a storage system.

FIG. 2 is a diagram showing an embodiment of a storage system. In some embodiments, storage system 112 of system 100 of FIG. 1 can be implemented with the example of FIG. 2. In the example shown, storage system 112 includes network connection 202 and communication interface 204, such as a network interface card or other interface. Storage system 112 further includes network file system front end 206 configured to handle network file system (NFS) requests from a hypervisor regarding disk operations performed by virtual machines such as virtual machine 102 of FIG. 1. However, types of storage system requests other than NFS, such as SCSI, iSCSI, SMB or any other appropriate type, may be used as well. Storage system 112 includes file system 208 configured and optimized to store virtual machine data. Storage 210 is configured to store data associated with one or more virtual machines, such as virtual machine 102 of FIG. 1. In some embodiments, storage 210 is configured to store a file or other data object associated with a control virtual disk such as control virtual disk 104 of FIG. 1 to use to track state or other data associated with the control virtual disk. For example, a status of a pending storage management operation written to the control virtual disk may be written in the file. Metadata 212 is configured to store metadata identifying which stored data objects, such as files or other virtual machine storage abstractions, are associated with which virtual machine or virtual disk. In some embodiments, metadata 212 is also configured to store data identifying which virtual disk or portion thereof of a particular virtual machine is configured as a control virtual disk or control portion of a virtual disk. In some embodiments, metadata 212 is also configured to store data identifying special offsets of a control virtual disk or control portion of a virtual disk (e.g., such that data written to one offset is to be treated differently than data written to another offset). For example, when an NFS request is received at the network file system front end 206 associated with a disk operation by a virtual machine, stored metadata of metadata 212 can be used to determine whether the data (e.g., an offset) associated with the disk operation is associated with a control virtual disk or control portion of a virtual disk and therefore should be treated as control disk traffic instead of a normal disk operation.

Figure 3A:
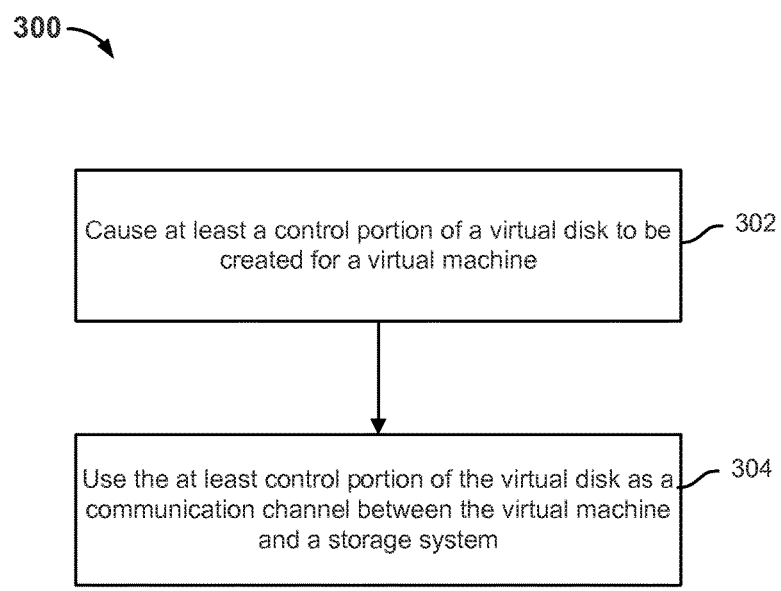
FIG. 3A is a flow diagram showing an embodiment of a process for establishing a communication channel between a virtual machine and a storage system.

FIG. 3A is a flow diagram showing an embodiment of a process for establishing a communication channel between a virtual machine and a storage system. In some embodiments, process 300 is implemented at a storage system such as storage system 112 of system 100 of FIG. 1.

Process 300 shows an example of causing a control virtual disk or control portion of a virtual disk to be created for a virtual machine so that the control virtual disk or control portion of a virtual disk can be used as a communication channel between the virtual machine and a storage system.

At 302, at least a control portion of a virtual disk is caused to be created for a virtual machine. In some embodiments, a special set of instructions (e.g., a software such as a script or binary) configured to create a control virtual disk or control portion of a virtual disk is sent to the virtual machine. In some embodiments, the special set of instructions configured to create a control virtual disk or control portion of a virtual disk for the virtual machine may be executed at the storage system through a storage interface.

At 304, the at least control portion of the virtual disk is used as a communication channel between a virtual machine and a storage system. Once the control virtual disk or control portion of a virtual disk is created, data written to the control virtual disk or control portion of a virtual disk by either a software running on the virtual machine or by the storage system will be treated as control disk traffic, instead of a normal write operation. The control virtual disk or control portion of a virtual disk enables a user (with the appropriate level of access privileges) of the virtual machine to request storage management tasks or send other data directly to the storage system by writing to the at least control portion of the virtual disk (e.g., via a software running on the virtual machine) and also receive communications (e.g., response data or messages) sent by the storage system by reading from the at least control portion of the virtual disk. The control virtual disk or control portion of a virtual disk enables the storage system to receive such requests for storage management tasks or other data sent from the software running on the virtual machine by reading from the at least control portion of the virtual disk and also to send communications to the virtual machine by writing to the at least control portion of the virtual disk.

Figure 3B:
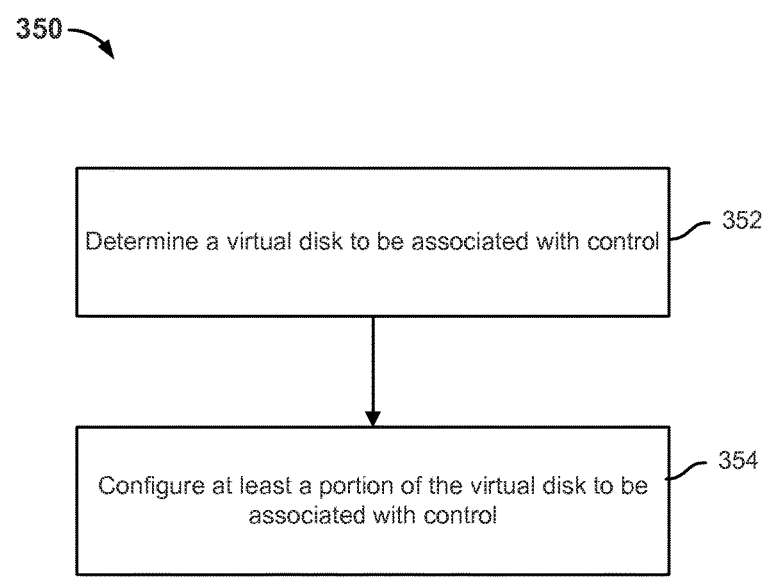
FIG. 3B is a flow diagram showing an embodiment of a process for creating a control virtual disk or control portion of a virtual disk of a virtual machine.

FIG. 3B is a flow diagram showing an embodiment of a process for creating a control virtual disk or control portion of a virtual disk of a virtual machine. In some embodiments, process 350 is implemented at a virtual machine such as virtual machine 102 of system 100 of FIG. 1.

Process 350 shows an example of creating a control virtual disk or control portion of a virtual disk for a virtual machine so that a user with the appropriate level of access privileges to the guest operating system of the virtual machine is enabled to perform self-service storage management at a storage system via performing reads and writes to the at least control portion of the virtual disk. In some embodiments, process 350 is implemented by a special set of computer instructions (e.g., a script, binary, or other type of software) executing at the virtual machine. For example, the special set computer instructions may be sent to the virtual machine and/or downloaded by the virtual machine. In another example, the special set computer instructions may be written to a virtual disk. In some other embodiments, the special set of instructions may be executed at the storage device or hypervisor, through a storage or hypervisor interface.

At 352, a virtual disk to be associated with control is determined. In some embodiments, a new virtual disk is provisioned for the virtual machine and to be used as a control virtual disk. In some embodiments, an existing virtual disk of the virtual machine is determined to be used as a control virtual disk. In some embodiments, regardless if a new virtual disk or an existing virtual disk is used for control, only a portion (e.g., a subset of the offsets) of the virtual disk is partitioned to comprise a control portion of the virtual disk, while the remaining portion of the virtual disk may be used for non-control purposes. In some embodiments, the client virtual machine may inform the storage system of a desired portion of a virtual disk to be used as a control portion through a specially formatted write operation.

At 354, at least a portion of the virtual disk is configured to be associated with control. The virtual disk or portion thereof that is determined to be associated with control is configured to include properties distinctive of its purpose of being used to request storage management operations at a storage system. For example, the configured at least control portion of the virtual disk may include a special master boot record (MBR) that points to a custom partition table. The custom partition table may include the special offsets that demarcate one or more partitions or sectors that are to be used for various types of control disk traffic with the storage system (e.g., associated with opening or closing a session, requesting the performance of a storage management operation, or causing the receipt of information from the storage system). Examples of partitions or sectors within a control virtual disk or a control portion of a virtual disk are described in further detail below.

Figure 4:
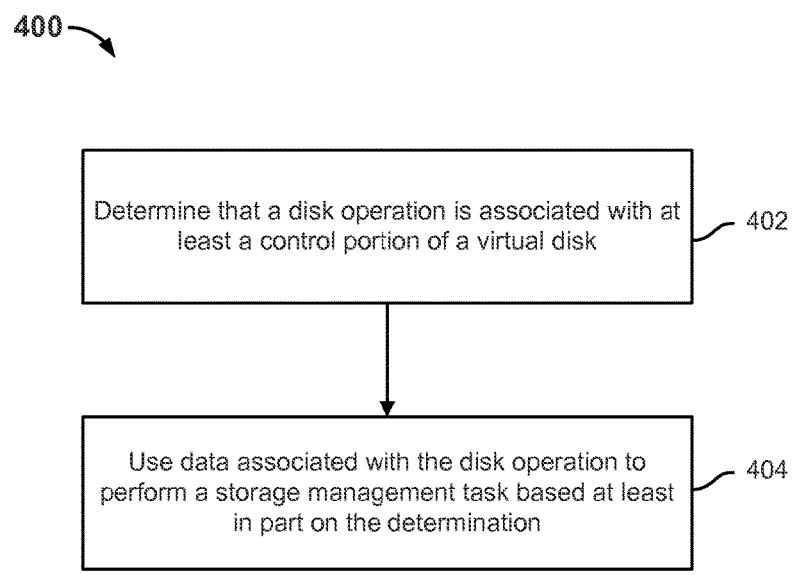
FIG. 4 is a flow diagram showing an embodiment of a process for storage management.

FIG. 4 is a flow diagram showing an embodiment of a process for storage management. In some embodiments, process 400 is implemented at storage system 112 of system 100 of FIG. 1.

Process 400 shows an example of a storage system determining that a disk operation to at least a control portion of a virtual disk should be treated in a special manner (e.g., as control disk traffic) by virtue of the disk operation having occurred with respect to the at least control portion of the virtual disk.

At 402, it is determined that a disk operation is associated with at least a control portion of a virtual disk. In response to a disk operation (e.g., a write operation) having been performed by a virtual machine, the storage system receives an indication associated with the event. For example, a hypervisor associated with the virtual machine may detect the occurrence of the disk operation and send a corresponding message to the storage system. The storage system may determine that the disk operation has occurred with respect to the at least control portion of a virtual disk of the virtual machine (as opposed to another non-control related virtual disk) based on the message received from the hypervisor (e.g., the message may have included the offset(s) at which the disk operation occurred), the stored metadata associated with the virtual machine, distinctive markers associated with data associated with the disk operation, and/or other data associated with the disk operation. For example, the storage system can determine whether the disk operation is made to the control portion of the virtual disk by comparing the data (e.g., offset(s) and/or identifying information of the virtual disk) associated with the disk operation to stored data describing the range of offsets of a control portion in a virtual disk and/or identifying information of a control virtual disk.

At 404, data associated with the disk operation is used to perform a storage management task based at least in part on the determination. In some embodiments, the storage system is configured to treat the disk operation associated with the at least control portion of the virtual disk in a manner different than if the same disk operation were written to a non-control related virtual disk. For example, if the disk operation is a write operation to the at least control portion of the virtual disk, the storage system is configured to treat at least a portion of the data associated with the write operation as control disk traffic from a user of the guest operating system running on the virtual machine. In some embodiments, the control disk traffic describes a storage management task requested by a user with the required level of access privileges. Examples of the storage management task comprise establishing/closing a session and various types of storage management operations. For example, the storage system may be configured to use the data associated with the disk operation to perform the storage management task of establishing/closing a session or performing a requested management operation. In some embodiments, after performing the storage management task, the storage system is configured to transfer data associated with the performed task (e.g., information associated with the opened/closed session and/or results of the storage management operation) to the guest operating system running on the virtual machine by writing data back to the at least control portion of the virtual disk. For example, if the write operation were made to a non-control virtual disk, the storage system may be configured to treat the data associated with the write operation as something that is other than control disk traffic.

While the data associated with the disk operation in the example of process 400 is used to perform a storage management task, data associated with the disk operation may be used in other appropriate manners as well.

Figure 5:
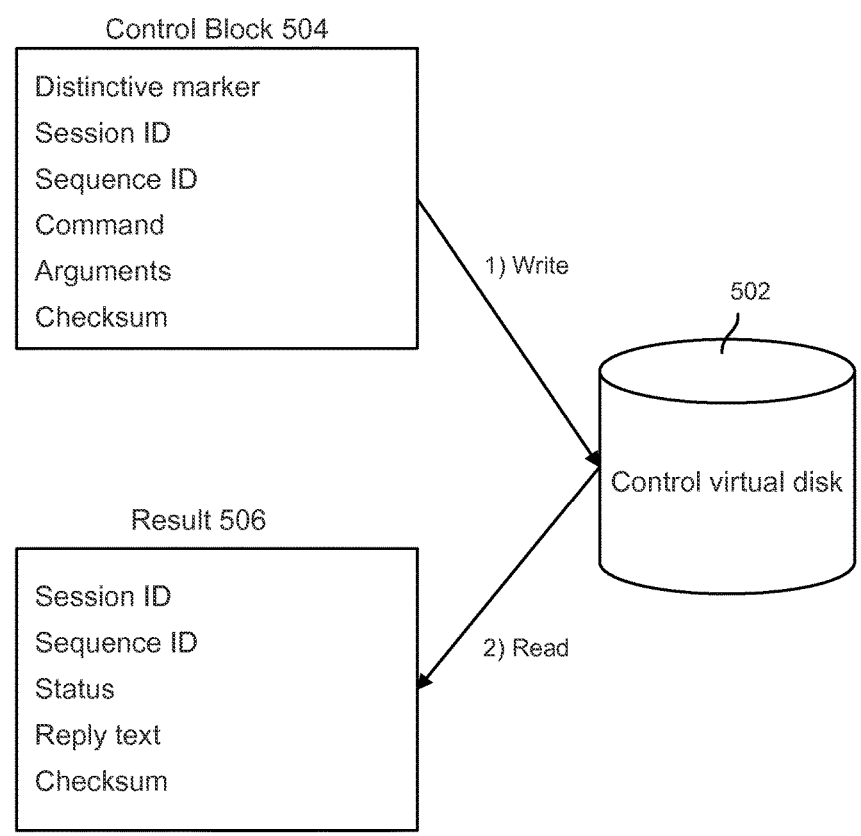
FIG. 5 is a diagram showing an example of a write and a read operation by a guest operating system to its control virtual disk.

FIG. 5 is a diagram showing an example of a write and a read operation by a guest operating system to its control virtual disk. For example, control virtual disk 502 can represent control virtual disk 104 of virtual machine 102 of system 100 of FIG. 1.

A user with the appropriate level of access privileges to the guest operating system can initiate storage management operations by writing specially formatted control blocks to a designated control virtual disk, such as control virtual disk 502. In some embodiments, the control blocks are specially formatted by the special set of computer instructions at the virtual machine. In some embodiments, the control blocks may be required to be written to special offsets within the virtual disk. For example, a control block may comprise 4 KB in size. As shown in the example, control block 504, which is to be written to control virtual disk 502, is specially formatted to include a distinctive marker and a checksum, for example. A distinctive marker may comprise any data sequence that is unlikely to occur in practice and may include an "eye-catcher" that is easy to visually identify. Such markers may include strings or hexadecimal digits, for example. An example of a distinctive marker may be "===TINTRI CVD===17328408133843174" or 0xDEAD-BEEF23983948. The checksum can be used to avoid mistakes where ordinary data rather than control information is inadvertently written to the control virtual disk. As shown in the example, in addition to a distinctive marker and a checksum, control block 504 may also include a session ID, a sequence ID, a command, and arguments. The session ID may identify an open session that has been previously established with the storage system. The sequence ID may identify the position of control block 504 within a sequence of control blocks that are to be interpreted by the storage system based on the sequence. For example, increasing sequence ID is often used in communication protocols to identify duplicate messages, detect missing dropped messages, or to provide a message component that is guaranteed to be unique in each message. For example, if two messages labeled with the sequence ID=3 are received at the storage system, then it may be concluded that the second message may be a duplicate of the first. Also, if messages with sequence ID=1, 2, 4, and 5 are received, then it may be concluded that the message with sequence ID=3 is missing. The command and arguments may indicate the type and parameters of a storage management operation that is requested to be performed by the storage system for the virtual machine associated with control virtual disk 502, or it may contain blocks of data to be transferred to the storage device for storage or use in passing to another entity.

The storage system is configured to detect the control blocks such as control block 504 of control virtual disk 502, in some embodiments, based on their distinctive properties (e.g., distinctive marker, checksum, or offset), decode the control blocks, and execute the requested storage management operation that is described by the control blocks. After executing the requested storage management operation, the storage system may relay information back to the virtual machine via a write to (e.g., special offsets of) control virtual disk 502. The storage system can write a result such as result 506 to control virtual disk 502. Result 506 may include data associated with an executed storage management operation requested by the virtual machine, for example. In the example, result 506 includes a session ID, a sequence ID, a status, a reply text, and a checksum. The session ID may refer to the open session for which the result applies. The sequence ID may identify the position of result 506 within a sequence of results data that are to be read by the guest operating system. The status may represent whether the performance of the storage management operation was successful, failed, or still pending. In the event of a failure, the status may further indicate the cause of the failure. The reply text contains the result of the operation if successful (e.g. if a list of snapshots was requested, then the reply text would be the list). If the operation was not successful, the reply text may describe the reason for failure. The checksum may be used to determine whether the result is correctly read by the guest operating system.

The guest operating system of the virtual machine is configured to detect result 506 and/or other result data having been written by the storage system to control virtual disk 502 and to read and interpret result 506. For example, if a user had requested a snapshot to be made for the virtual machine at the storage system by writing control block 504 to control virtual disk 502, then result 506 that is written to control virtual disk 502 by the storage system may include data associated with the created snapshot and/or other information related to the result.

Figure 6:
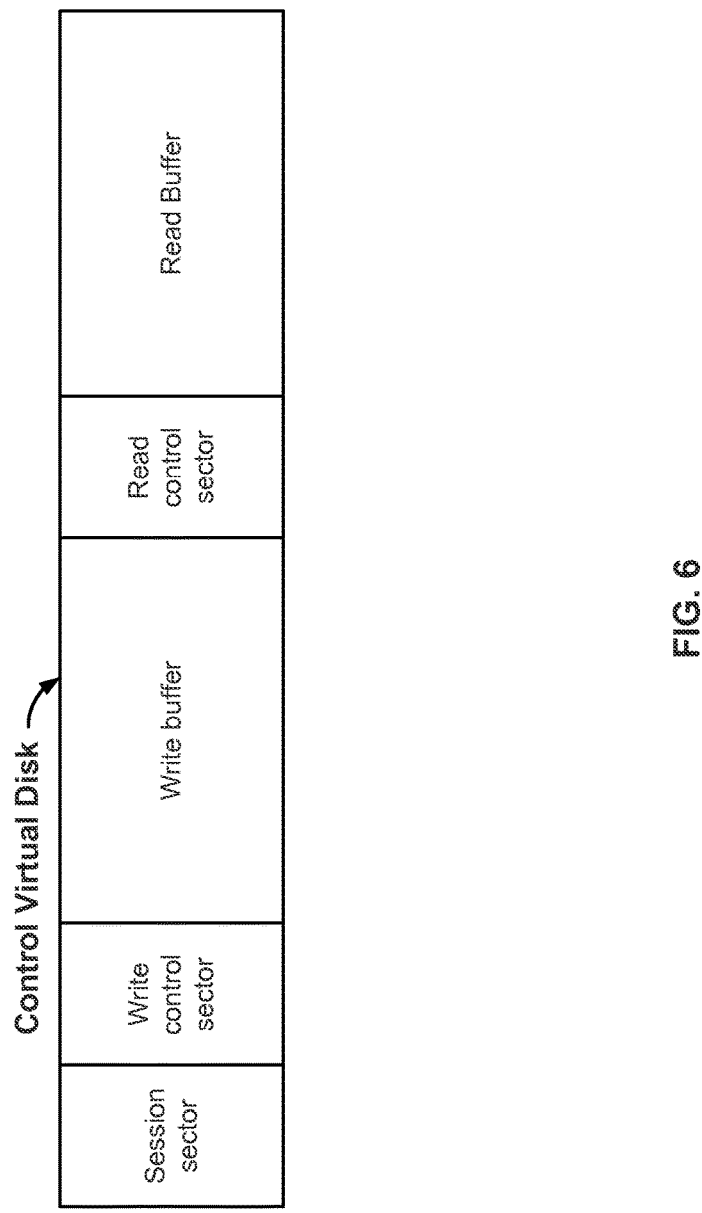
FIG. 6 is a diagram showing an example of various sectors associated with a control virtual disk.

FIG. 6 is a diagram showing an example of various sectors associated with a control virtual disk. In some embodiments, control virtual disk 104 of system 100 of FIG. 1 is implemented using the example of FIG. 6. A control virtual disk may include additional and/or different sectors, partitions, and/or data (e.g., a reserved space) other than those shown in the example. In the example, the control virtual disk includes a session sector, a write control sector, a write buffer, a read control sector, and a read buffer. In some embodiments, each of the session sector, the write control sector, the write buffer, the read control sector, and the read buffer is associated with a range of offsets (or at least a start offset and an end offset). In some embodiments, at least some of the start and end offsets of a session sector, a write control sector, a write buffer, a read control sector, and a read buffer are included in a custom partition table pointed to by a master boot record associated with the control virtual disk.

The session sector displays session information and allows the guest operating system to open a session. The write control sector allows the guest operating system to communicate control disk traffic (e.g., requested storage management operations) to the storage system. The write buffer is used to store data associated with a command and/or other data that is to be passed to the storage system. The read control sector is used by the storage system to communicate control information to the guest operating system. The read buffer is used to store data transferred from the storage system.

As will be further described below, in some embodiments, communication takes place between the guest operating system of the virtual machine and the storage system based on a (e.g., session, read, or write) control sector or a (e.g., read or write) buffer to which either the guest operating system and/or the storage system writes data. In some embodiments, the storage system stores metadata associated with the control virtual disk and/or its associated virtual machine that identifies which offsets are associated with each of session sector, the write control sector, the write buffer, the read control sector, and the read buffer. Once the storage system determines that a write operation has been made with respect to the control virtual disk, in some embodiments, the storage system uses the stored metadata to determine to which control sector and/or buffer the data has been written and then interprets the written data based on the location to which it was written. Similarly, the storage system may send information to be received by the guest operating system through writing it to the appropriate location of the control virtual disk.

In some embodiments, the set of a session sector, the write control sector, and the write buffer are included in a write partition and the read control sector and the read buffer are included in a read partition. In some embodiments, one write partition and read partition pair (as shown in the example of FIG. 6) supports one open session between the guest operating system of the virtual machine associated with the control virtual disk and the storage system. To support multiple sessions, a corresponding number of write partition and read partition pairs may need to be created for the control virtual disk.

Figure 7:
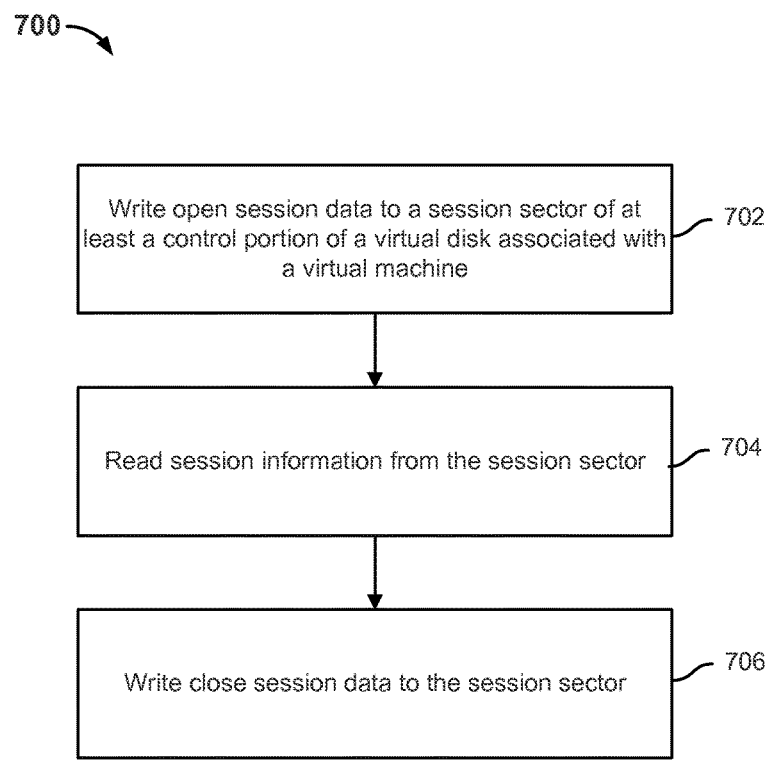
FIG. 7 is a flow diagram showing an embodiment of a process for opening and closing a session with a storage system.

FIG. 7 is a flow diagram showing an embodiment of a process for opening and closing a session with a storage system. In some embodiments, process 700 is implemented at virtual machine 102 of system 100 of FIG. 1. In some embodiments, a special set of computer instructions (e.g., a script or a binary) executing at virtual machine 102 is configured to perform at least a portion of process 700.

Process 700 shows an example of using a control virtual disk (or a control portion of a virtual disk) to request the storage system to open a session and later, to close the session. For example, after the session is opened by the storage system, the guest operating system may exchange messages with the storage system. The session may be closed when the information exchange is to end, for example. Opening or establishing a session is an example storage management task that may be requested by the guest operating system to be performed by the storage system using the control virtual disk or the control portion of a virtual disk.

At 702, open session data is written to a session sector of at least a control portion of a virtual disk associated with a virtual machine. In some embodiments, prior to communication between the virtual machine and the storage system can begin, a session is first established. To begin a session, open session data is written to an appropriate location of the control virtual disk or the control portion of a virtual disk associated with the virtual machine. For example, the open session data may include one or more of the following: a randomly generated session identifier to uniquely identify the session, the offsets and size of the other control areas, session specific options/configurations, and an identifier of a higher level protocol to use for the session. For example, the storage system may understand multiple types of protocols such as general purpose TCP/IP, REST commands, custom interfaces. In the example, the open session data is written to a range of offsets associated with the at least control portion of the virtual disk associated with a session sector (e.g., such as the session sector shown in the example control virtual disk of FIG. 6).

A mechanism associated with the storage system is configured to detect and use data written to the session sector to establish a new session. After the storage system has created the new session based on the contents of the open session data, the storage system, in some embodiments, is configured to (e.g., via a mechanism) write session information to the session sector of the at least control portion of the virtual disk. For example, such session information may include data associated with whether a session has been successfully established and if so, a session ID of the new session and a state associated with the session.

At 704, session information is read from the session sector. In some embodiments, the session sector is checked (e.g., every configured interval or in response to a detected event) at the virtual machine to determine whether session information has been written by the storage system. Once the session information is detected, it may be read and stored by the guest operating system. The guest operating system may validate the session information and determine whether the session has been successfully established. In the event it is determined based on the session information that the session has been successfully established, a storage management operation submitted by a user of the appropriate access privileges to the guest operating system may be transferred to the storage system via the at least control portion of the virtual disk.

At 706, close session data is written to the session sector. When the guest operating system wishes to close the session, a close session data is written to the session sector. For example, the close session data may include information such as identifying information associated with the guest operating system, identifying information associated with the virtual machine, a message associated with closing a session, and the session ID associated with the session that is desired to be closed. While 706 describes a virtual machine initiating to close a session, in some embodiments, the storage system may initiate to close a session due to a client error or a server side operation. The information in the control sectors will allow the client virtual machine to determine that the session has been closed by the storage system, and allow it to attempt to re-connect.

Figure 8:
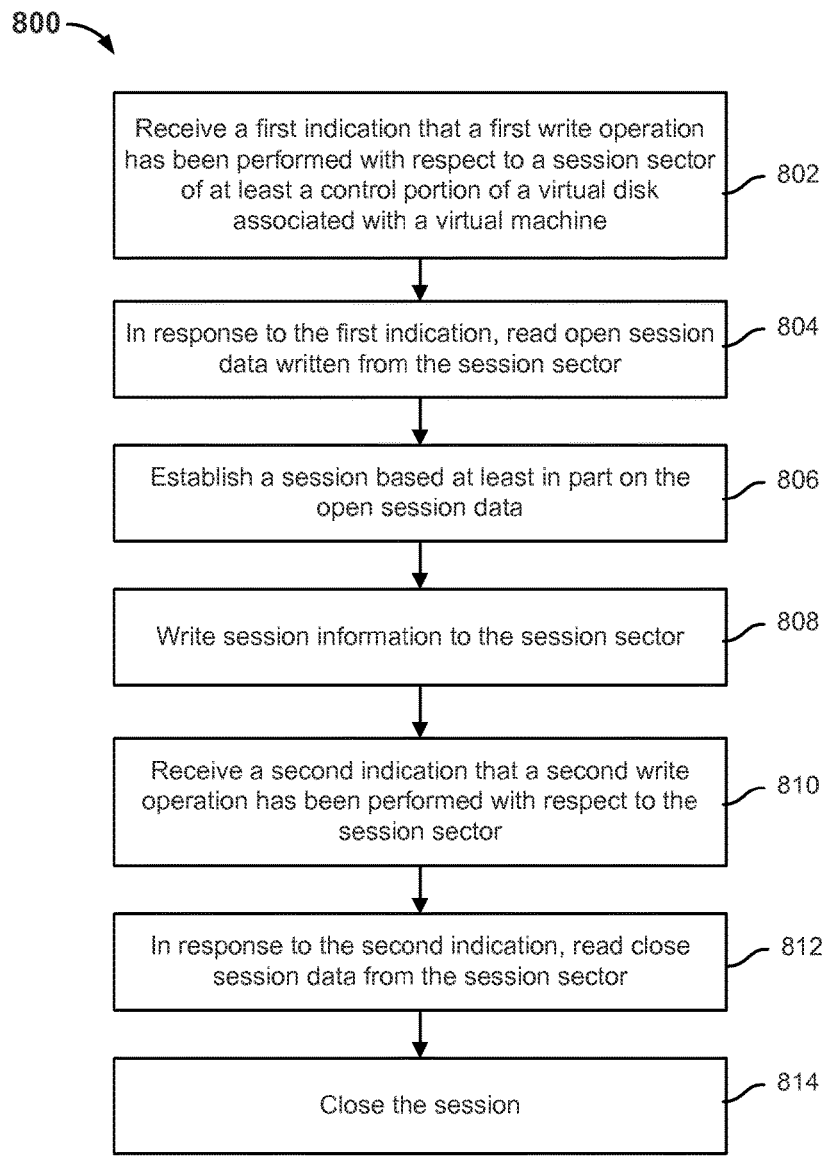
FIG. 8 is a flow diagram showing an embodiment of a process for opening and closing a session by a storage system.

FIG. 8 is a flow diagram showing an embodiment of a process for opening and closing a session by a storage system. In some embodiments, process 800 is implemented at storage system 112 of FIG. 1. In some embodiments, a mechanism (e.g., a shim layer) configured at storage system 112 is configured to implement at least a portion of process 800.

Process 800 shows an example of receiving at a storage system data associated with the storage management tasks of opening and closing a session with a guest operating system via a control virtual disk (or a control portion of a virtual disk).

At 802, a first indication that a first write operation has been performed with respect to a session sector of at least a control portion of a virtual disk associated with a virtual machine is received. For example, the first indication that the first write operation has been performed may be received from a hypervisor that detected the write. The storage system may determine that the write operation has occurred with respect to a session sector of the at least control portion of a virtual disk based on comparing an offset associated with the write and stored metadata associated with the virtual machine, for example.

At 804, in response to the first indication, open session data is read from the session sector.

At 806, a session based at least in part on the open session data is established. Based on the determination that the write operation had occurred at the session sector, a new session is opened based on the contents of the open session data that is written to the session sector.

At 808, session information is written to the session sector. Session information associated with the newly established session (e.g., a session ID, a state) is written to the session sector for the guest operating system to read. In some embodiments, in the event that a session is not successfully established, the session information will reflect the failure to establish a new session.

As messages (e.g., requests for storage management operations) are received by the storage system, the storage system may update stored data associated with the state corresponding to the opened session (e.g., in the file or data object that was previously created for the at least control portion of the virtual disk). For example, the state may indicate the status (e.g., pending, completed) of each requested storage management operation associated with a session ID.

At 810, a second indication that a second write operation has been performed with respect to the session sector is received. For example, the second indication that the second write operation has been performed may be received from a hypervisor that detected the write.

At 812, in response to the second indication, close session data is read from the session sector. The close session data is read from the session sector. In some embodiments, once a session has been opened, data other than the close session data that is written to the session sector is ignored by the storage system.

At 814, the session is closed. The storage system closes the session associated with the close session data.

Session-based communication may be useful in inferring when a failure event has occurred in the system. For example, in the event that an error occurs with respect to a virtual machine such that the guest operating system is restarted, the guest operating system will attempt to open a new session, which will be associated with a session ID different than a session opened previous to the restart of the guest operating system. The guest operating system may send a new request for a storage management operation via the at least control portion of the virtual disk associated with the new session ID. In response to the detection of the new requested storage management operation, the storage system can determine that the session ID differs from the previous session ID associated with the same at least control portion of the virtual disk, and therefore clean up the state or other data maintained with respect to the previous session ID. For example, the maintained state data (e.g., in the file maintained for the at least control portion of the virtual disk) can include pending storage management operations associated with the previous session ID. This way, the storage system can use session data to determine when not to complete or return data for a requested storage management operation for a particular client.

Figure 9:
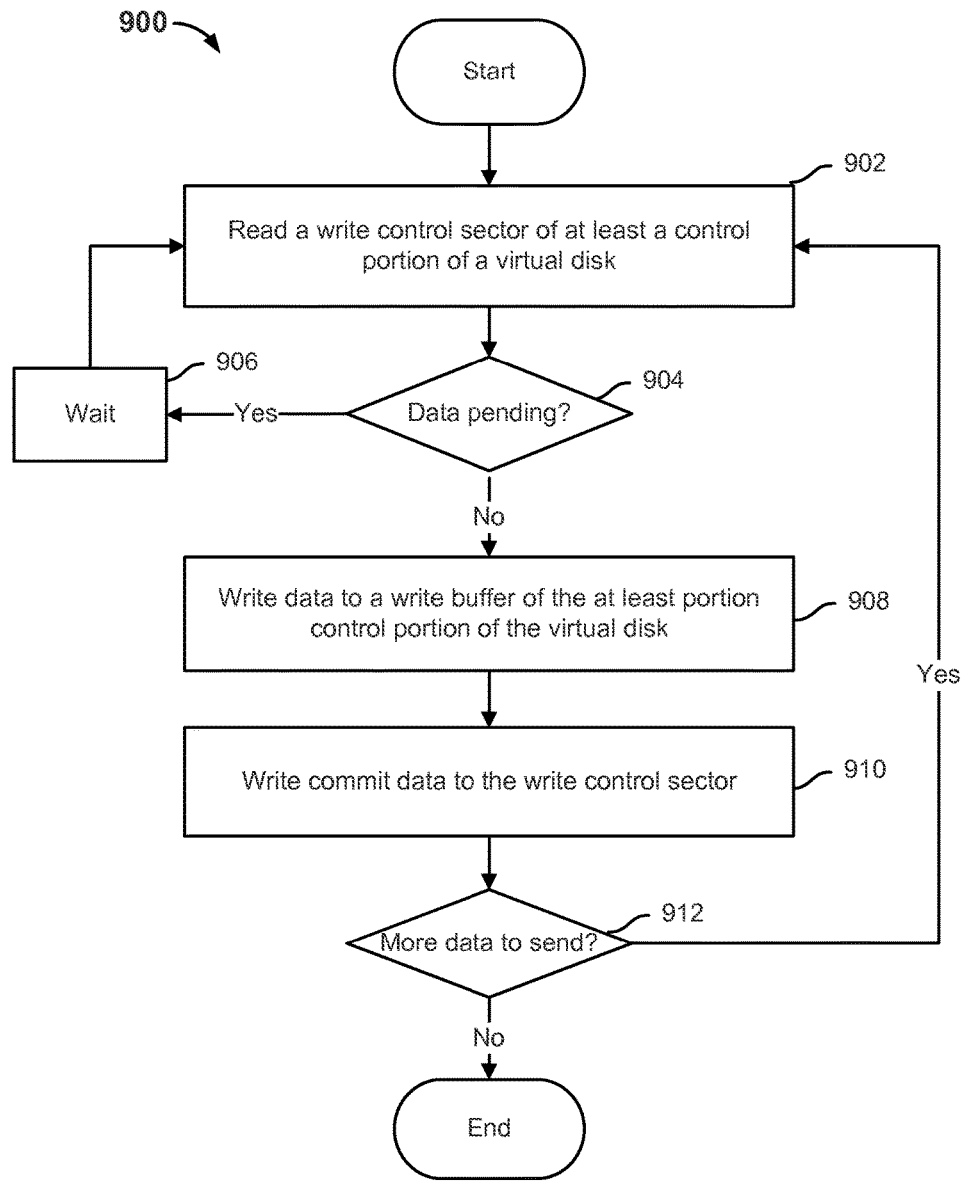
FIG. 9 is a flow diagram showing an embodiment of a process for sending data to a storage system.

FIG. 9 is a flow diagram showing an embodiment of a process for sending data to a storage system. In some embodiments, process 900 is implemented at virtual machine 102 of system 100 of FIG. 1. In some embodiments, a special set of computer instructions (e.g., a script or a binary) executing at virtual machine 102 is configured to perform at least a portion of process 900.

Process 900 shows an example of interactions that may be performed with respect to a control virtual disk or control portion of a virtual disk to send data to a storage system (e.g., to cause a storage system to perform a storage management operation) from a user with the appropriate level of access privileges to a guest operating system of the virtual machine.

At 902, a write control sector of at least a control portion of a virtual disk is read.

At 904, it is determined whether data is pending. In the event that data in the write control sector is pending, control is transferred to 906, in which waiting is performed prior to returning to 902. In the event that data in the write control is not pending, control is transferred to 908. In some embodiments, prior to writing data to send to the storage system to the write control sector (e.g., such as the write control sector shown in the example control virtual disk of FIG. 6), the write control sector is read to determine whether data is currently pending. For example, data pending in the write control sector may be data previously written by a software of the virtual machine that has not yet been fully processed by the storage system.

At 908, data is written to a write buffer of the at least control portion of the virtual disk. The data (or "control disk traffic") written to the write buffer may describe a storage management task or comprise at least a stream of data (e.g., that may not describe a complete storage management task). In some embodiments, the data written to the write buffer describes a storage management operation. A type of storage management operation is an example storage management task that may be requested by the guest operating system to be performed by the storage system using the control virtual disk or the control portion of a virtual disk. In some embodiments, the storage management operation is submitted by a user with the appropriate level of access privileges (e.g., over a user interface associated with the virtual machine). Put another way, if a user who authenticates to the guest operating system is associated with a level of access privileges that meets the one required to use the control virtual disk (or a control portion of a virtual disk), the user is permitted to submit a request for a storage management operation (e.g., via a user interface associated with the virtual machine) to the storage system. For example, the appropriate level of access privileges may be configured for each virtual machine.

Examples of storage management operations may include, but are not limited to, creating snapshots; attaching a new virtual disk to a virtual machine with older snapshot versions of data for data recovery purposes; reverting the state of a virtual disk to an earlier state; enabling/disabling certain storage management features related to quality-of-service/performance; accessing state, statistics or reporting information of a virtual machine or virtual disk; adding or removing virtual disks to the virtual machine; HTTP traffic; and even general purpose (not limited to storage) modification or monitoring of the virtual machine For example, data associated with the storage management operation is written to a range of offsets in the at least control portion of the virtual disk that is associated with the write buffer (e.g., such as the write buffer shown in the example control virtual disk of FIG. 6). The data associated with the storage management operation may be written as one or more control blocks (e.g., such as control block 504 of FIG. 5). The data associated with the storage management operation may, for example, describe one or more of the following: the desired storage management operation, one or more parameters associated with the operation, information associated with an associated session, and a checksum.

At 910, commit data is written to the write control sector. In some embodiments, to indicate to the storage system that there is data written to the write buffer, commit data is written to the write control sector of the at least control portion of the virtual disk. The commit data may include a message indicating that at least a portion (e.g., a specific range of offsets) of the write buffer is to be read and/or a size of the data is to be read from the write buffer.

In some embodiments, data to be sent to the storage system may be written to the write buffer over multiple writes. For example, if the data to be sent to the storage system is large (e.g., over a size threshold), then the data may be broken into multiple portions, such that after a first portion is written to the write buffer at a first set of offsets, a corresponding commit data is written to the write control sector so that the storage system may read the written first portion. As the storage system is reading the first portion from the write buffer, the second portion of data may be written to the write buffer at a second set of offsets. Once the second portion of data is written to the write buffer, a corresponding commit data is written to the write control sector so that the storage system may read the written second portion, and so forth. If the data to be sent is to be written as portions over multiple writes, then, for example, a commit data may also indicate whether another portion of data is to be read from the write buffer after the current portion is read. As such, the storage system can be informed from the commit data written to the write control sector whether to expect to read more portions of data and if so, offsets and/or the size of the written portion of data to be read from the write buffer.

At 912, it is determined whether more data is to be sent to the storage system. In the event it is determined that more control disk traffic data is to be written to the write buffer, control is transferred to 902. Otherwise, process 900 ends. As described above, in some embodiments, data to be sent to the storage system may be written as portions over multiple writes. If there are more portions of the data to be written to and read from the write buffer, then it is determined that more data is to be written to the write buffer. Otherwise, if the data to be sent has been completely written to the write buffer, then it is determined that no more data is to be written to the write buffer.

In some embodiments, after process 900 ends, response data associated with the sent data (e.g., describing a storage management operation) is read from the write control sector.

The write control sector may be checked (e.g., periodically or in response to a detected event) for response data, for example, associated with the storage management operation that is written by the storage system. After the storage system processes the requested storage management operation, the storage system is configured to write a response data to the write control sector. For example, the response data may indicate the success or failure of the storage management operation and/or a result data associated with the storage management operation, if applicable. In some embodiments, the response data is written as one or more result blocks (e.g., such as result 506 of FIG. 5). For example, if the storage management operation was for an operation to create a snapshot of a virtual machine with a certain retention policy, then the response data may include an indication that the snapshot was successfully created, the created snapshot, and/or a location at which the created snapshot is stored.

In some embodiments, an error at the storage system may be detected if the response data is not detected (e.g., within a configured time interval since the data associated with the storage management operation was written to the write buffer) at the write control sector of the at least control portion of the virtual disk. In this case, data associated with the storage management operation may be rewritten to the write buffer or a prompt associated with the detected storage system error may be presented to the user of the guest operating system at a user interface.

Figure 10:
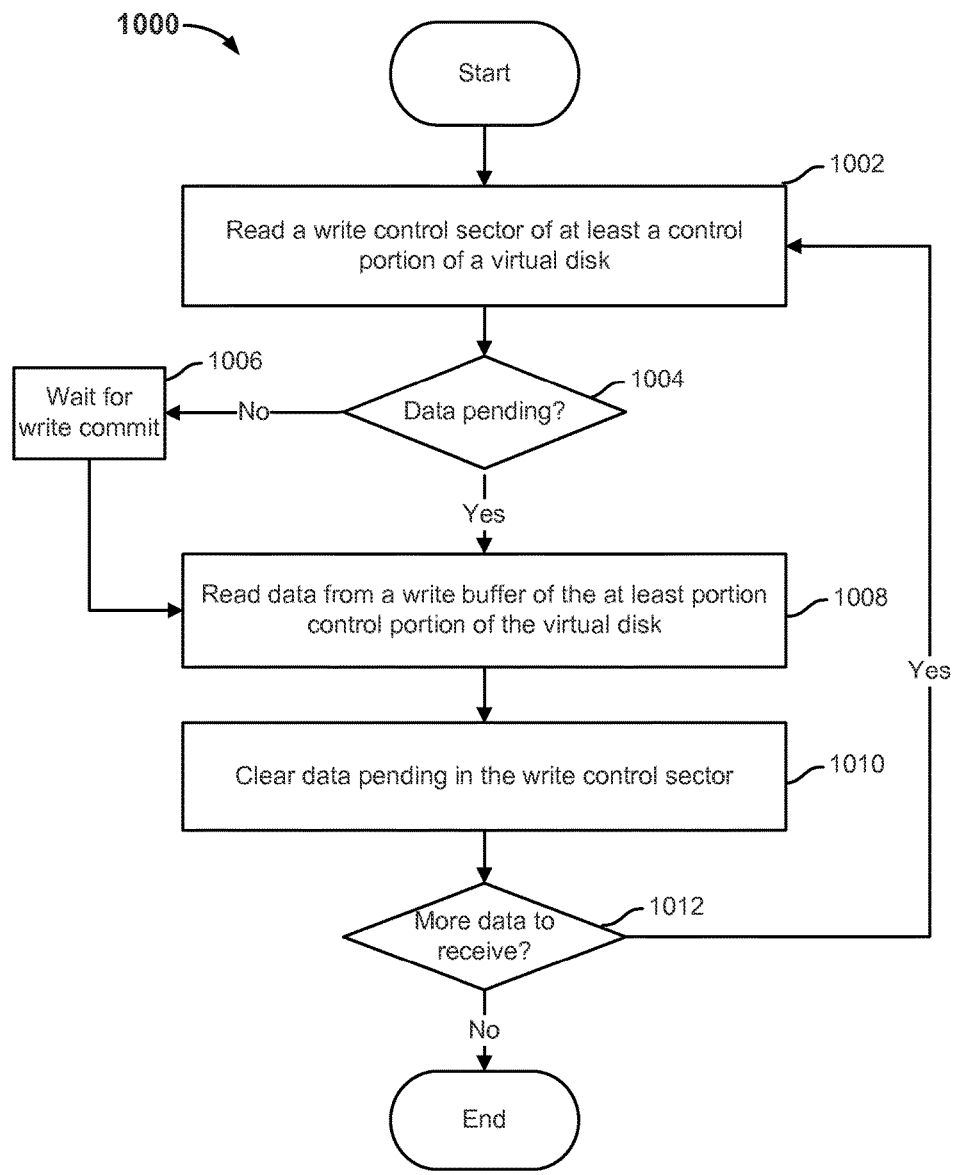
FIG. 10 is a flow diagram showing an embodiment of a process for receiving data at a storage system.

FIG. 10 is a flow diagram showing an embodiment of a process for receiving data at a storage system. In some embodiments, process 1000 is implemented at storage system 112 of system 100 of FIG. 1. In some embodiments, a mechanism (e.g., a shim layer) configured at storage system 112 is configured to implement at least a portion of process 1000.

Process 1000 shows an example of interactions that may be performed by a storage system to receive data (e.g., describing a storage management operation) from a guest operating system of a virtual machine.

At 1002, a write control sector of at least a control portion of a virtual disk is read. For example, the write control sector may be read in response to an indication that the write operation has been performed may be received from a hypervisor that detected the write. The storage system may determine that the write operation has occurred with respect to a write control sector of the at least control portion of a virtual disk based on comparing an offset associated with the write and stored metadata associated with the virtual machine, for example.

At 1004, it is determined whether data is pending. In the event that data is pending, control is transferred to 1008. For example, data pending in the write control sector may be data that is associated with content previously written to a write buffer that has not yet been read by the storage system. In the event that data is not pending, control is transferred to 1006, in which waiting for a write commit is performed and after the write commit has been detected, control is transferred to 1008. For example, the write commit is detected when commit data is read from the write control sector. In some embodiments, the commit data may include data indicating that the data sent from the virtual machine will be written as portions over multiple writes and a size (and associated offset(s)) of a portion of the data to be read from the write buffer. In some embodiments, the commit data may include data indicating that the data sent from the virtual machine has been completely written to the write buffer at one or more offsets.

At 1008, data is read from a write buffer of the at least control portion of the virtual disk. The control disk traffic data is read from the write buffer in a manner that is determined by the commit data, for example. For example, data from the write buffer may be read from one or more offsets and/or based on a size indicated by the commit data.

At 1010, data pending in the write control sector is cleared. After the data written to the write buffer has been read by the storage system, the data pending in the write control sector is cleared.

At 1012, it is determined whether there is more data to be received. In the event it is determined that more data sent from the virtual machine is to be read from the write buffer, control returns to 1002. Otherwise, process 1000 ends. The commit data may have indicated whether more data (e.g., additional portions of data associated with a storage management operation) is to be read from the write buffer.

In some embodiments, a storage management operation described by the received data is processed. The storage system may process the storage management operation by performing a storage management operation, for example. After the storage management operation is processed, for example, response data associated with the storage management operation is written to the write control sector. For example, the response data may indicate the success or failure of the storage management operation and/or a result data associated with the storage management operation, if applicable.

Figure 11:
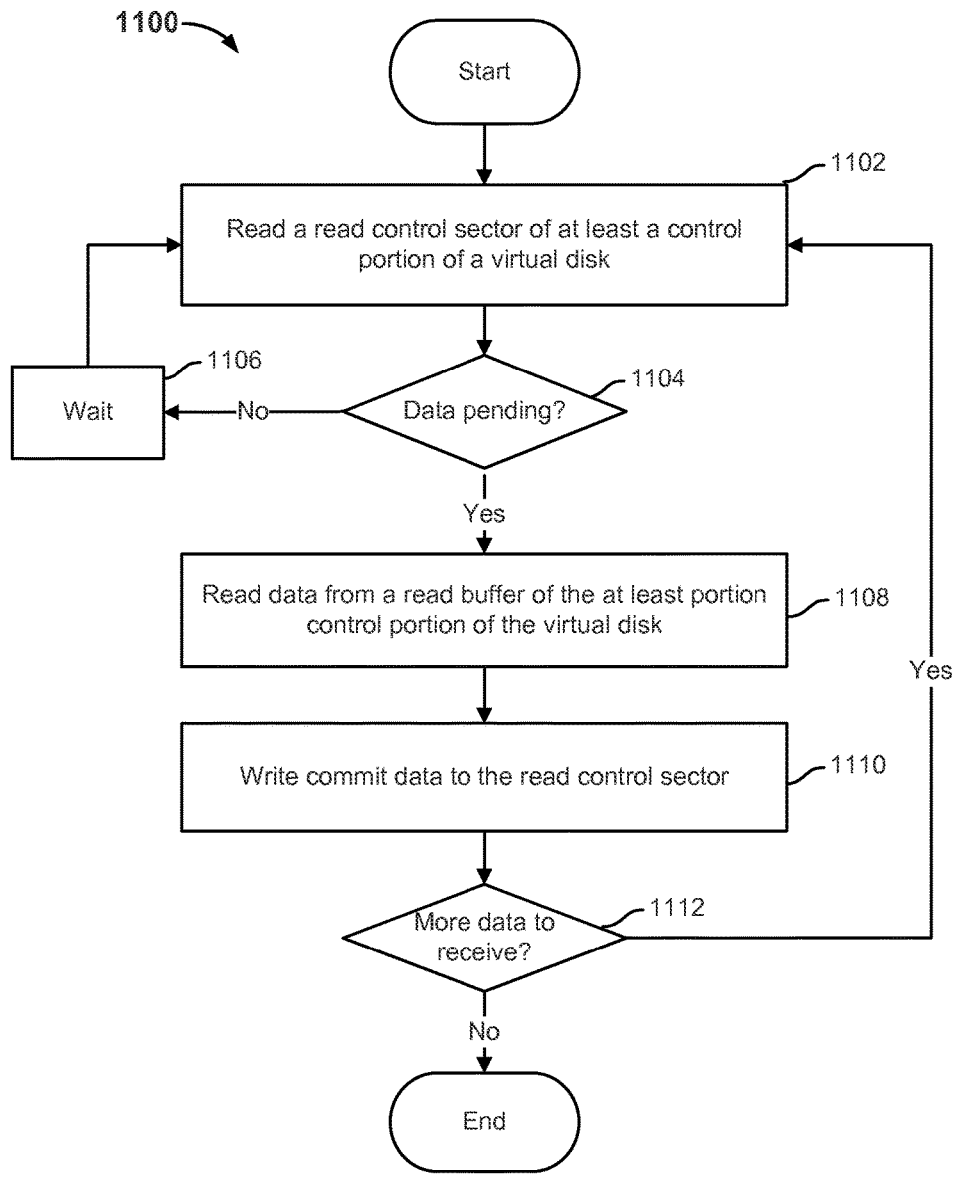
FIG. 11 is a flow diagram showing an embodiment of a process for receiving data from a storage system.

FIG. 11 is a flow diagram showing an embodiment of a process for receiving data from a storage system. In some embodiments, process 1100 is implemented at virtual machine 102 of system 100 of FIG. 1. In some embodiments, a special set of computer instructions (e.g., a script or a binary) executing at virtual machine 102 is configured to perform at least a portion of process 1100.

Process 1100 shows an example of interactions that may be performed with respect to a control virtual disk or control portion of a virtual disk to receive a message from a storage system. For example, the storage system may initiate sending a message to the virtual machine when reporting on the status of pending (asynchronous) operations previously started by the guest operating system, reporting on events/alerts/statistics such as the current load or performance, and/or requesting that the guest operating system perform an operation on behalf of the storage system.

At 1102, a read control sector of at least a control portion of a virtual disk is read.

At 1104, it is determined whether data is pending. In the event that data is pending in the read control sector, control is transferred to 1106, in which waiting is performed prior to returning to 1102. In the event that data in the read control sector is not pending, control is transferred to 1108. In some embodiments, the read control sector (e.g., such as the read control sector shown in the example control virtual disk of FIG. 6) is checked (e.g., at every configured interval or in response to a detected event) to determine whether pending data (e.g., notification data) has been written by the storage system to the read control sector of the at least control portion of the virtual disk. For example, the notification data may indicate at which offset(s) a message from the storage system is written to the read buffer and/or the size of the message.

In some embodiments, the data to be received by the virtual machine may be written to the read buffer over multiple writes. For example, if the data to be received by the virtual machine is large (e.g., over a size threshold), then the data may be broken into multiple portions, such that after a first portion is written to read buffer at a first set of offsets, a corresponding notification data is written to the read control sector so that the guest operating system may read the written first portion. As the guest operating system is reading the first portion from the write buffer, the second portion of the data may be written to the read buffer at a second set of offsets. Once the second portion of data is written to the read buffer, a corresponding notification data is written to the read control sector so that the guest operating system may read the written second portion, and so forth.

At 1108, data is read from a read buffer of the at least control portion of the virtual disk. In response to detecting that the notification data has been written to the read control sector, control disk traffic data (e.g., including the message sent from the storage system) is read from the read buffer in a manner that is determined by the notification data, for example. For example, data from the read buffer may be read from one or more offsets and/or based on a size indicated by the notification data. In some embodiments, the read data may be copied into memory.

At 1110, commit data is written to the read control sector. Commit data that indicates to the storage system that the message has been successfully or unsuccessfully read by the guest operating system is written to the read control sector for the storage system to detect.

At 1112, it is determined whether more data of the message is to be received. In the event it is determined that more data is to be read from the read buffer, control returns to 1102. Otherwise, process 1100 ends. For example, whether more data is to be read from the read buffer is determined from the previously read notification data.

Figure 12:
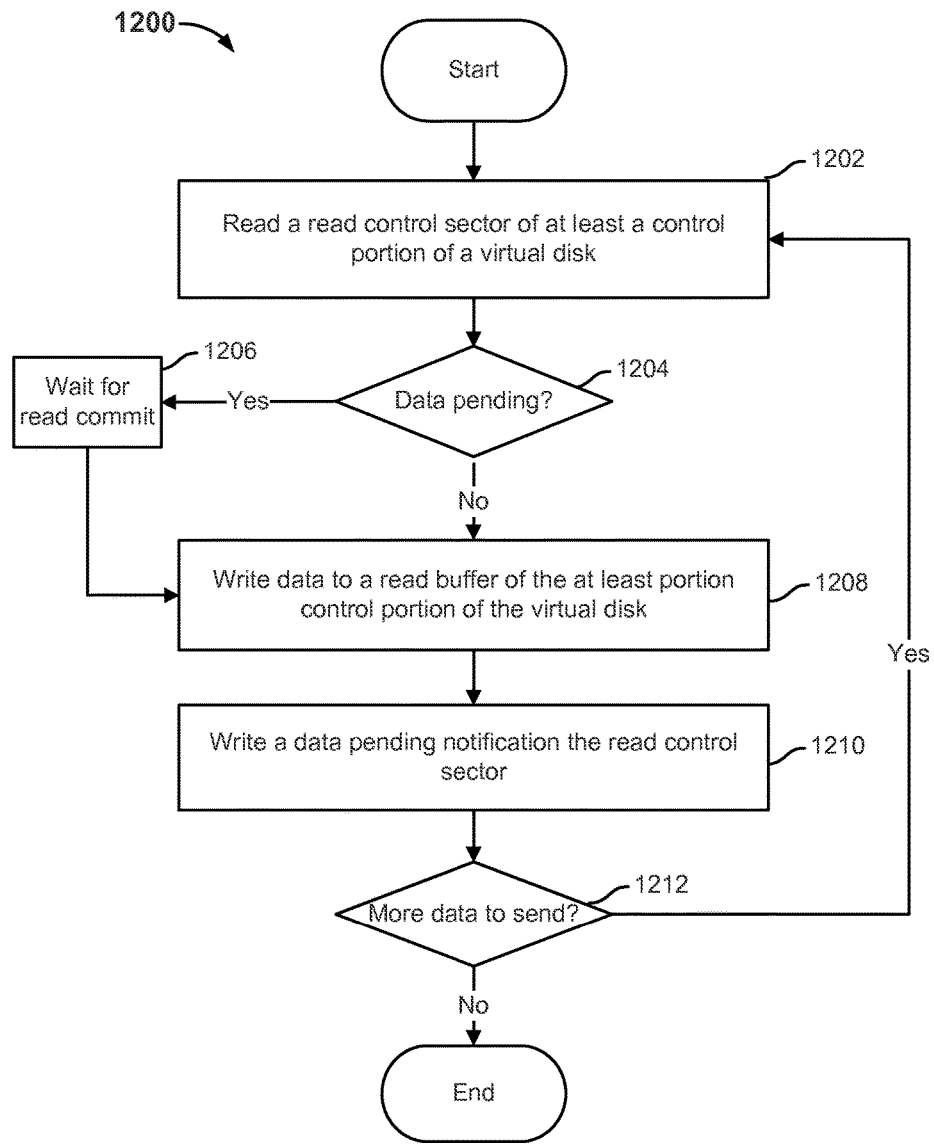
FIG. 12 is a flow diagram showing an embodiment of a process for sending data by a storage system.

FIG. 12 is a flow diagram showing an embodiment of a process for sending data by a storage system. In some embodiments, process 1200 is implemented at storage system 112 of system 100 of FIG. 1. In some embodiments, a mechanism (e.g., a shim layer) configured at storage system 112 is configured to implement at least a portion of process 1200.

Process 1200 shows an example of interactions that may be performed with respect to a control virtual disk or control portion of a virtual disk to send a message from a storage system to a virtual machine.

At 1202, a read control sector of at least a control portion of a virtual disk is read. Data is read from the read control sector of the at least control portion of the virtual disk of the virtual machine to which data is intended to be sent.

At 1204, it is determined whether data is pending. In the event that data is not pending, control is transferred to 1208. For example, data pending in the read control sector may be data that is associated with content previously written to a read buffer that has not yet been read by the virtual machine. In the event that data is pending, control is transferred to 1206, in which waiting for a read commit is performed and after the read commit has been detected, control is transferred to 1208. For example, the read commit is detected when commit data is read from the read control sector. In some embodiments, whether the guest operating system was able to successfully read a previously sent message or not may be determined from the commit data. In some embodiments, in the event that the previously sent message was not successfully read by the guest operating system, the storage system may resend that message.

At 1208, data is written to a read buffer of at least a control portion of a virtual disk. The control disk traffic data (e.g., including a message to be received by the virtual machine) is written to the read buffer over one or more writes to the read buffer.

At 1210, a data pending notification is written to the read control sector. Notification data that describes the offsets to which the message is written, the size of the message, and/or whether the message is written as a single or multiple writes, for example, is written to the read control sector. In response to detecting the notification data in the read control sector, the virtual machine is configured to read the data written to the read buffer.

At 1212, it is determined whether more data is to be sent. In the event it is determined that more data is to be written from the read buffer, control returns to 1202. Otherwise, process 1200 ends. In the event that less than the all the data to be sent to the virtual machine has been written to the read buffer, more data may be written to the read buffer.

Through the use of reading and writing data to (e.g., appropriate locations) a control virtual disk (or a control portion of a virtual disk), requests and/or messages may be passed between a guest operating system of a virtual machine and a storage system, in a manner that is transparent to any intermediate entities. As a result, a user with the appropriate level of access privileges to the guest operating system may request certain storage management operations of the storage system that were not previously directly available to the user, without reliance on intermediate entities, such as a hypervisor administrator.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A storage management system, comprising:
   a processor configured to:
      send instructions to create a control portion of a virtual disk to a virtual machine, wherein the control portion of the virtual disk includes a plurality of offsets, and wherein each offset is associated with at least one location of the control portion of the virtual disk including one or more of the following: a session sector, a write control sector, a write buffer, a read control sector, and a read buffer;
      create the control portion of the virtual disk based on the sent instructions;
      in response to creation of the control portion of the virtual disk, storing, by a storage system, metadata identifying valid offset ranges associated with the at least one location of the control portion of the virtual disk;
      use the control portion of the virtual disk as a communication channel between a software running on the virtual machine and the storage system, wherein using the control portion of the virtual disk as the communication channel comprises:
         receiving a request, via the virtual machine, from a user with administrative privilege to perform a disk operation, the request containing specially formatted data that represents control disk traffic denoted by one or more of the following: a storage system offset, and an storage management task to be performed;
         detect, from a hypervisor, an indication that the disk operation has occurred with respect to the at least the control portion of the virtual disk;
         forward, by the hypervisor, the detected disk operation to the storage system, via a network protocol;
         compare, by the storage system, the storage system offset associated with the disk operation to the valid offset ranges of the metadata stored at the storage system;
         if the offset falls within the valid offset ranges, interpret the specially formatted data associated with the disk operation to determine the storage management task;
         perform an action associated with the storage management task using the control disk traffic, based at least in part on the interpreted specially formatted data and one of the at least one location of the control portion of the virtual disk; and
         upon completion of the performed action, transfer response data associated with the performed action, by the storage system, back to the virtual machine via the control portion of the virtual disk; and
   a memory coupled to the processor and configured to provide instructions to the processor.

2. The storage management system of claim 1, wherein the disk operation comprises a write operation.

3. The storage management system of claim 1, wherein performing the action associated with the storage management task includes using the specially formatted data associated with the disk operation to perform the storage management task.

4. The storage management system of claim 3, wherein using the specially formatted data from the request associated with the disk operation includes steps to:
   determine that the disk operation is associated with the session sector;
   read the specially formatted data associated with the disk operation from the session sector; and
   perform the storage management task comprising establishing a session based at least in part on the specially formatted data associated with the disk operation.

5. The storage management system of claim 4, wherein the processor is further configured to write session information associated with the established session to the session sector.

6. The storage management system of claim 4, wherein the processor is further configured to track a state of the established session.

7. The storage management system of claim 3, wherein to use the specially formatted data from the request associated with the disk operation includes steps to:
   determine that the disk operation is associated with the write control sector; and
   read the specially formatted data from the write buffer.

8. The storage management system of claim 7, wherein the specially formatted data read from the write buffer comprises the request associated with the storage management task comprising a storage management operation, and wherein the processor is further configured to perform the storage management operation.

9. The storage management system of claim 8, wherein the processor is further configured to write response data associated with the performed storage management operation to the write control sector.

10. The storage management system of claim 8, wherein the storage management operation includes one or more of the following:
   creating a snapshot; attaching a new virtual disk to the virtual machine with older snapshot versions of data; reverting a state of a specified virtual disk to an earlier state; enabling/disabling certain storage management features related to quality-of-service/performance; accessing state, statistics or reporting information of the virtual machine or a specified virtual disk; and adding or removing a specified virtual disk to the virtual machine.

11. The storage management system of claim 1, wherein a request from a user for the disk operation associated with the at least control portion of the virtual disk is permitted based at least in part on a level of access privileges associated with the user with respect to the virtual machine.

12. The storage management system of claim 1, wherein the disk operation comprises a first disk operation and wherein the processor is further configured to:
   determine a message for the virtual machine; and
   perform a second disk operation associated with the message with respect to the control portion of the virtual disk, wherein the virtual machine is configured to read the message based at least in part on detecting performance of the disk operation associated with the message with respect to the control portion of the virtual disk.

13. The storage management system of claim 12, wherein the second disk operation associated with the message comprises a write operation of the message with respect to a read buffer.

14. The storage management system of claim 12, wherein the second disk operation associated with the message comprises a write operation of notification data with respect to a read control sector.

15. The storage management system of claim 14, wherein the processor is further configured to read commit data from the read control sector, wherein the commit data indicates whether the message was or was not successfully read by the virtual machine.

16. The storage management system of claim 1, wherein the at least control portion of the virtual disk is created by a guest-side software associated with the virtual machine.

17. The storage management system of claim 1, wherein to use the control portion of the virtual disk as the communication channel between the software running on the virtual machine and the storage system enables a user associated with the virtual machine to communicate with the storage system without coordination from a hypervisor administrator.

18. The storage management system of claim 1, wherein the processor is further configured to:
   determine a message for the virtual machine; and
   write data associated with the message to a read buffer.

19. The storage management system of claim 6, wherein to track the state of the established session comprises:
   tracking a state of completion of the storage management task associated with the session.

20. A method, comprising:
   sending, by a processor, instructions to create a control portion of a virtual disk to a virtual machine, wherein the control portion of the virtual disk includes a plurality of offsets, and wherein each offset is associated with at least one location of the control portion of the virtual disk including one or more of the following: a session sector, a write control sector, a write buffer, a read control sector, and a read buffer;
   creating the control portion of the virtual disk based on the sent instructions;
   in response to creation of the control portion of the virtual disk, storing, by a storage system, metadata identifying valid offset ranges associated with the at least one location of the control portion of the virtual disk;
   using, by a processor, the control portion of the virtual disk as a communication channel between a software running on the virtual machine and the storage system, wherein using the control portion of the virtual disk as the communication channel comprises:
      receiving a request, via the virtual machine, from a user with administrative privilege to perform a disk operation, the request containing specially formatted data that represents control disk traffic denoted by one or more of the following: a storage system offset, and an storage management task to be performed;
      detecting, from a hypervisor, an indication that the disk operation has occurred with respect to the at least the control portion of the virtual disk;
      forwarding, by the hypervisor, the detected disk operation to the storage system, via a network protocol;
      comparing, by the storage system, the storage system offset associated with the disk operation to the valid offset ranges of the metadata stored at the storage system; and
      if the offset falls within the valid offset ranges, interpreting the specially formatted data associated with the disk operation to determine the storage management task;
      performing an action associated with the storage management task using the control disk traffic, based at least in part on the interpreted specially formatted data and one of the at least one location of the control portion of the virtual disk; and
      upon completion of the performed action, transferring response data associated with the performed action, by the storage system, back to the virtual machine via the control portion of the virtual disk.

21. The method of claim 20, wherein the disk operation comprises a write operation.

22. The method of claim 20, wherein performing the action associated with the storage management task includes using the specially formatted data associated with the disk operation to perform the storage management task.

23. The method of claim 22, wherein using the specially formatted data from the request associated with the disk operation includes:
   determining that the disk operation is associated with the session sector;
   reading the specially formatted data associated with the disk operation from the session sector; and
   performing the storage management task comprising establishing a session based at least in part on the specially formatted data associated with the disk operation.

24. The method of claim 22, wherein using the specially formatted data from the request associated with the disk operation includes:
   determining that the disk operation is associated with the write control sector; and
   reading specially formatted data from the write buffer.

25. The method of claim 24, wherein the specially formatted data read from the write buffer comprises a request associated with the storage management task comprising a storage management operation and wherein the processor is further configured to perform the storage management operation.

26. The method of claim 20, wherein a request from a user for the disk operation associated with the control portion of the virtual disk is permitted based at least in part on a level of access privileges associated with the user with respect to the virtual machine.

27. The method of claim 20, wherein the disk operation comprises a first disk operation and further comprising:
- determining a message for the virtual machine; and
- performing a second disk operation associated with the message with respect to the control portion of the virtual disk, wherein the virtual machine is configured to read the message based at least in part on detecting performance of the disk operation associated with the message, with respect to the control portion of the virtual disk.

28. A computer program product, wherein the computer program product being embodied in a non-transitory computer readable storage medium and comprising computer instructions for:
- sending instructions to create a control portion of a virtual disk to a virtual machine, wherein the control portion of the virtual disk includes a plurality of offsets, and wherein each offset is associated with at least one location of the control portion of the virtual disk including one or more of the following: a session sector, a write control sector, a write buffer, a read control sector, and a read buffer;
- creating the control portion of the virtual disk based on the sent instructions;
- in response to creation of the control portion of the virtual disk, storing, by a storage system, metadata identifying valid offset ranges associated with the at least one location of the control portion of the virtual disk;
    - using the control portion of the virtual disk as a communication channel between a software running on the virtual machine and the storage system, wherein using the control portion of the virtual disk as the communication channel comprises receiving a request, via the virtual machine, from a user with administrative privilege to perform a disk operation, the request containing specially formatted data that represents control disk traffic denoted by one or more of the following: a storage system offset, and an storage management task to be performed;
- detecting, from a hypervisor, an indication that the disk operation has occurred with respect to the at least the control portion of the virtual disk;
- forwarding, by the hypervisor, the detected disk operation to the storage system, via a network protocol;
- comparing, by the storage system, the storage system offset associated with the disk operation to the valid offset ranges of the metadata stored at the storage system; and
- the offset falls within the valid offset ranges, interpreting the specially formatted data associated with the disk operation to determine the storage management task;
- performing an action associated with the storage management task using the control disk traffic, based at least in part on the interpreted specially formatted data and one of the at least one location of the control portion of the virtual disk; and
- upon completion of the performed action, transferring response data associated with the performed action, by the storage system, back to the virtual machine via the control portion of the virtual disk.

* * * * *

UNITED STATES PATENT AND TRADEMARK OFFICE
CERTIFICATE OF CORRECTION

PATENT NO. : 10,120,700 B1
APPLICATION NO. : 14/043485
DATED : November 6, 2018
INVENTOR(S) : Walters et al.

Page 1 of 1

It is certified that error appears in the above-identified patent and that said Letters Patent is hereby corrected as shown below:

In the Claims

In Column 21, Claim 11, Line 8, before "control portion of the virtual" delete "at least".

In Column 21, Claim 16, Line 36, before "control portion of the virtual" delete "at least".

Signed and Sealed this
Twenty-first Day of May, 2019

Andrei Iancu
*Director of the United States Patent and Trademark Office*